United States Patent
Van Dyke et al.

(10) Patent No.: US 9,434,437 B2
(45) Date of Patent: Sep. 6, 2016

(54) MASTER CYLINDER-MOUNTED DISPLAY FOR A MOTORCYCLE

(75) Inventors: Matthew J. Van Dyke, West Allis, WI (US); Benjamin P. Davis, Brookfield, WI (US); Jeffary R. Sonnentag, Waukesha, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 1293 days.

(21) Appl. No.: 12/835,462

(22) Filed: Jul. 13, 2010

(65) Prior Publication Data

US 2011/0017560 A1  Jan. 27, 2011

Related U.S. Application Data

(60) Provisional application No. 61/228,033, filed on Jul. 23, 2009.

(51) Int. Cl.
| | |
|---|---|
| *B62L 3/02* | (2006.01) |
| *B60T 11/16* | (2006.01) |
| *B62J 99/00* | (2009.01) |
| *B60Q 3/04* | (2006.01) |
| *B60T 11/22* | (2006.01) |

(52) U.S. Cl.
CPC ............. *B62J 99/00* (2013.01); *B60Q 3/044* (2013.01); *B60T 11/22* (2013.01); *B62J 2099/0026* (2013.01); *B62J 2099/0033* (2013.01)

(58) Field of Classification Search
USPC ............ 188/344; 60/585; 340/438; 180/219
See application file for complete search history.

(56) References Cited

U.S. PATENT DOCUMENTS

| | | | |
|---|---|---|---|
| 1,944,905 A | 1/1934 | Rowell | |
| 3,856,123 A | 12/1974 | Kinsey | |
| 4,421,359 A * | 12/1983 | Hayashi et al. | ............. 303/9.61 |
| 4,687,072 A | 8/1987 | Komuro | |
| 4,740,905 A | 4/1988 | Murakami et al. | |
| 4,859,984 A | 8/1989 | Romano | |
| 5,625,336 A | 4/1997 | Yamamoto | |
| 5,676,021 A | 10/1997 | Campagnolo | |
| 5,900,705 A | 5/1999 | Kimura | |
| 5,903,214 A | 5/1999 | Watarai | |
| 5,952,729 A | 9/1999 | Shiratori et al. | |
| 6,060,985 A | 5/2000 | Siviero | |
| 6,204,752 B1 | 3/2001 | Kishimoto | |

(Continued)

FOREIGN PATENT DOCUMENTS

| | | |
|---|---|---|
| JP | 59018025 A | 1/1984 |
| JP | 2028076 A | 1/1990 |

(Continued)

OTHER PUBLICATIONS

Harley-Davidson Part Nos. 75054-03 and 75055-03 "Billet Analog Clock," offered for sale in the U.S. more than one year prior to Jul. 23, 2009.

(Continued)

*Primary Examiner* — Jacob Knutson
(74) *Attorney, Agent, or Firm* — Michael Best & Friedrich LLP

(57) ABSTRACT

A cover for a hydraulic master cylinder. The cover includes an interface configured to sealingly engage with a master cylinder body to jointly define a hydraulic fluid reservoir. An electronic display unit is positioned at least partially within the cover and viewable from outside the cover.

27 Claims, 7 Drawing Sheets

(56) References Cited

U.S. PATENT DOCUMENTS

| | | |
|---|---|---|
| 6,249,744 B1 | 6/2001 | Morita |
| 6,390,429 B1 | 5/2002 | Brincat |
| 6,400,564 B1 | 6/2002 | Nishimoto et al. |
| 6,538,221 B1 | 3/2003 | Nishimoto et al. |
| D472,862 S | 4/2003 | Arai |
| 6,588,297 B1 | 7/2003 | Day et al. |
| 6,695,090 B2 | 2/2004 | McAllister |
| 6,774,771 B2 * | 8/2004 | Takeda .......... 340/432 |
| 6,805,023 B2 | 10/2004 | Greetis |
| 6,915,567 B2 | 7/2005 | Nakao et al. |
| D515,981 S | 2/2006 | Gant et al. |
| 7,132,931 B2 * | 11/2006 | Okada .......... 340/427 |
| 7,159,679 B2 | 1/2007 | Sena |
| 7,290,779 B2 | 11/2007 | Takamoto et al. |
| 7,714,704 B1 * | 5/2010 | Mellen .......... 340/425.5 |
| 2002/0020249 A1 | 2/2002 | Darland et al. |
| 2003/0032327 A1 | 2/2003 | LaBonte |
| 2007/0046453 A1 | 3/2007 | Okabe et al. |
| 2007/0249220 A1 | 10/2007 | Shimizu |
| 2008/0023244 A1 | 1/2008 | Saitou et al. |
| 2008/0180233 A1 | 7/2008 | Miglioranza |
| 2009/0038432 A1 * | 2/2009 | Shimizu .......... 74/551.8 |

FOREIGN PATENT DOCUMENTS

| | | |
|---|---|---|
| JP | 3021582 A | 10/1991 |
| WO | 2006035921 A1 | 4/2006 |

OTHER PUBLICATIONS

Harley-Davidson Part Nos. 75041-03 and 75042-03 "Clutch Lever Bracket Clamp Clock," offered for sale in the U.S. more than one year prior to Jul. 23, 2009.

Harley-Davidson Part Nos. 75104-04 and 75042-04 "Master Cylinder Clamp Thermometer," offered for sale in the U.S. more than one year prior to Jul. 23, 2009.

Office Action from the Japanese Patent Office for Application No. 2010-165101 mailed on Jun. 10, 2014 (8 pages).

* cited by examiner

MASTER CYLINDER-MOUNTED DISPLAY FOR A MOTORCYCLE

CROSS-REFERENCE TO RELATED APPLICATIONS

This application claims priority to U.S. Provisional Patent Application No. 61/228,033, filed Jul. 23, 2009, the entire contents of which are incorporated by reference herein.

BACKGROUND

The present invention relates to motorcycle displays. Motorcycles typically have an array of gauges and displays for displaying various pieces of information to the rider, including at least a speedometer for displaying vehicle speed, and often a tachometer for displaying engine speed. Furthermore, some motorcycles also include one or more auxiliary displays that provide information relating to fuel level, gear selection, oil temperature/pressure, time of day, outside temperature etc. Most typically, basic gauges and any auxiliary displays are incorporated into a gauge cluster in the central area of the motorcycle near the steering head and a central portion of the handlebars. The basic gauges and any auxiliary displays are often housed in a front cowl or fairing, or they are mounted on the top of a fuel tank or on the handlebars.

An alternate method for mounting an analog clock to the side of a master cylinder reservoir includes adhering the back of the clock to the exterior surface of the reservoir with double-sided tape.

SUMMARY

In one aspect, the invention provides a cover for a hydraulic master cylinder. The cover includes an interface configured to sealingly engage with a master cylinder body to jointly define a hydraulic fluid reservoir. An electronic display unit is positioned at least partially within the cover and viewable from outside the cover.

In another aspect, the invention provides a hydraulic master cylinder assembly. The hydraulic master cylinder assembly includes a reservoir configured to hold a volume of fluid, a cover sealingly engaged with the body to contain the volume of fluid, and an electronic display unit positioned at least partially within the cover and viewable from outside the cover.

In yet another aspect, the invention provides a motorcycle including a handlebar, a wheel-braking device, a clutch configured to engage and disengage a transmission input with an engine output, and a hand lever associated with one of the wheel-braking device and the clutch. A hydraulic master cylinder assembly is associated with the hand lever. The hydraulic master cylinder assembly includes a reservoir configured to hold a volume of fluid, a cover sealingly engaged with the body to contain the volume of fluid, and an electronic display unit positioned at least partially within the cover and viewable from outside the cover.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
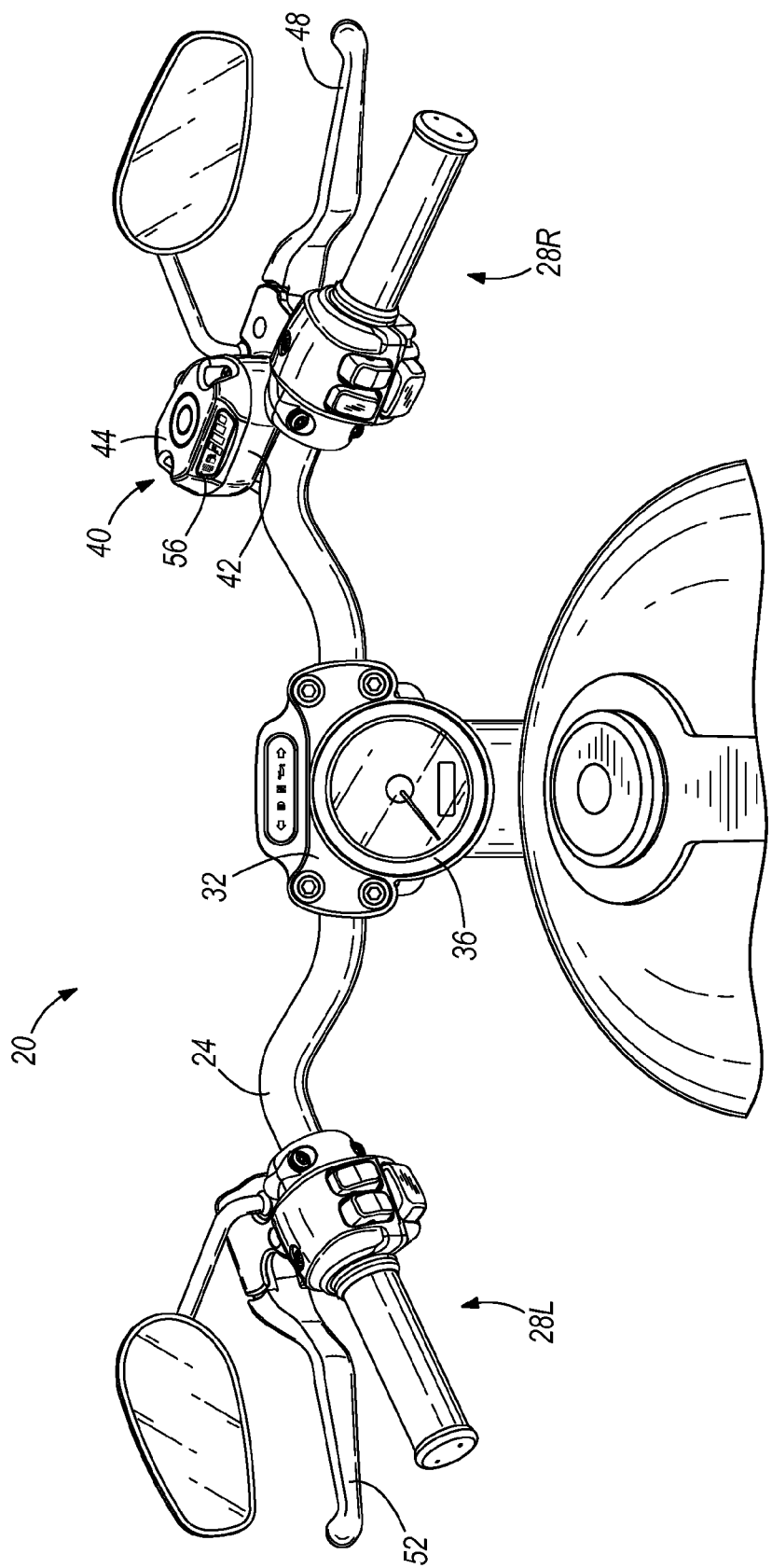
FIG. 1 is a view of the handlebars of a motorcycle from the rider's perspective, illustrating a front brake master cylinder having a cover including an electronic display unit.

FIG. 1 illustrates a portion of a motorcycle 20 as viewed from the rider's perspective. The motorcycle 20 includes a handlebar 24, which is grasped by the rider to control the direction of travel. In the illustrated construction, the handlebar 24 includes a single bar that extends from a left grip region 28L to a right grip region 28R and is clamped with a handlebar clamp 32 at a generally central portion of the handlebar 24, although other handlebar constructions may be used. In the illustrated construction, a speedometer 36 is coupled to the handlebar clamp 32 so that the motorcycle's speed can be displayed directly in front of the rider.

Figure 8:
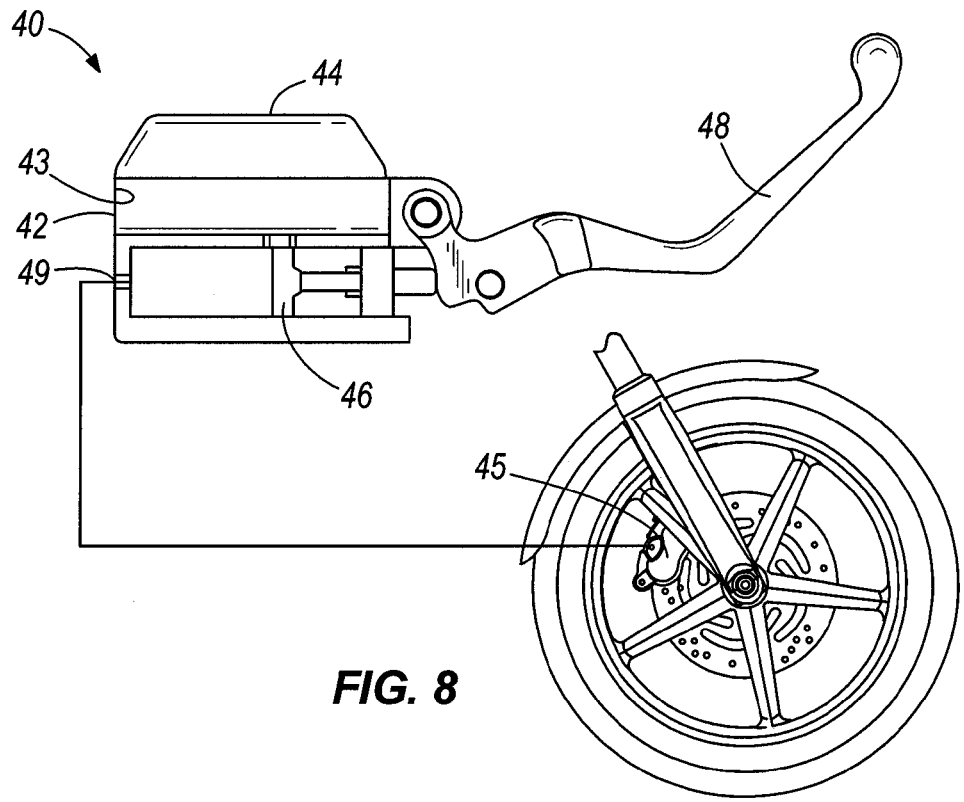
FIG. 8 is a schematic view of the front brake master cylinder coupled with a front brake of the motorcycle.
Figure 9:
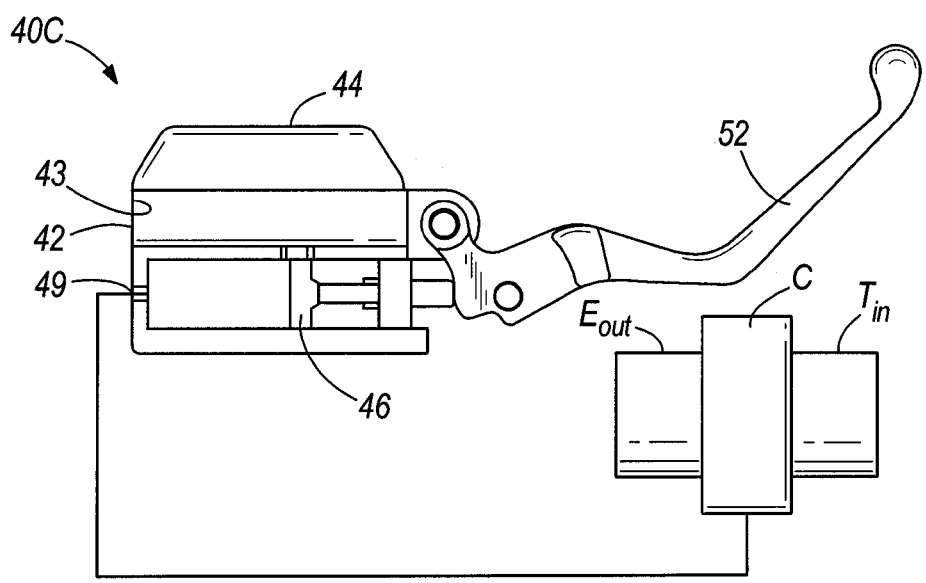
FIG. 9 is a schematic view of a master cylinder assembly

A front brake master cylinder assembly 40 (or simply "master cylinder 40" hereinafter) is supported by the handlebar 24 near the right grip region 28R. The master cylinder 40 includes a body 42 defining a hydraulic fluid reservoir 43 and a cover 44 for containing hydraulic fluid. The cover 44 has an interface configured to sealingly mate with the body 42 to jointly define the hydraulic fluid reservoir 43. A front brake lever 48 is hydraulically coupled to the master cylinder 40 to actuate the front brake(s) of the motorcycle 20 (e.g., brake caliper 45 of FIG. 8). The front brake lever 48 may be coupled to a piston 46 that is movable inside the body 42 in response to movement of the front brake lever 48 to pressurize hydraulic fluid lines coupled to and in communication with the body 42 and the reservoir 43 defined therein. Such hydraulic fluid lines are coupled to one or more outlets 49 in the body 42 (in fluid communication with the piston) and may be fluidly coupled with a hydraulically-actuable mechanism. Although shown and described with respect to the front brake (FIG. 9), a similar master cylinder assembly 40C as shown in FIG. 9 may be provided for a hydraulically-operated clutch C used for selectively engaging and disengaging a transmission input $T_{in}$ with an engine output $E_{out}$. In such a construction, the clutch master cylinder assembly 40C can be provided on the handlebar 24 near the left grip region 28L and hydraulically coupled to a clutch lever 52 to actuate the clutch C of the motorcycle 20 in a known manner.

As shown in FIGS. 1-3 and 5-7, the master cylinder 40 is provided with an integral electronic display unit 56. The illustrated display unit 56 is a fuel gauge, although other information may be displayed by the display unit 56 instead of or in addition to fuel level. It should also be noted that, although not explicitly illustrated, a display unit substantially identical to the illustrated display unit 56 can be integrated into a clutch master cylinder in substantially the same way as the illustrated display unit 56 is integrated into the front brake master cylinder 40 (described in detail below) in order to display information adjacent the left grip region 28L.

Figure 2:
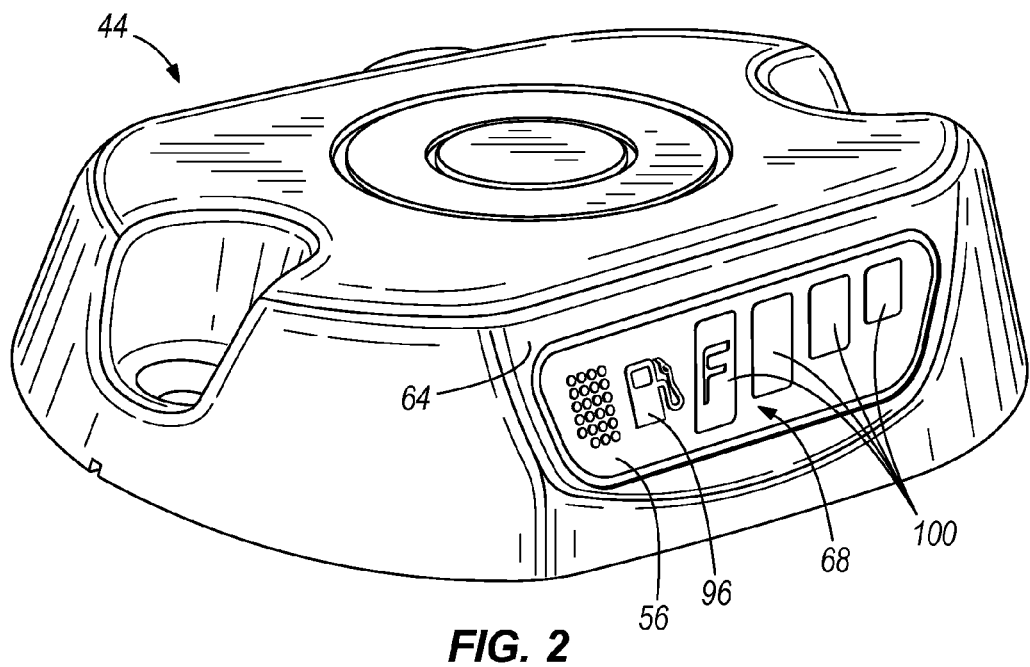
FIG. 2 is a perspective view of the cover of the front brake master cylinder.
Figure 3:
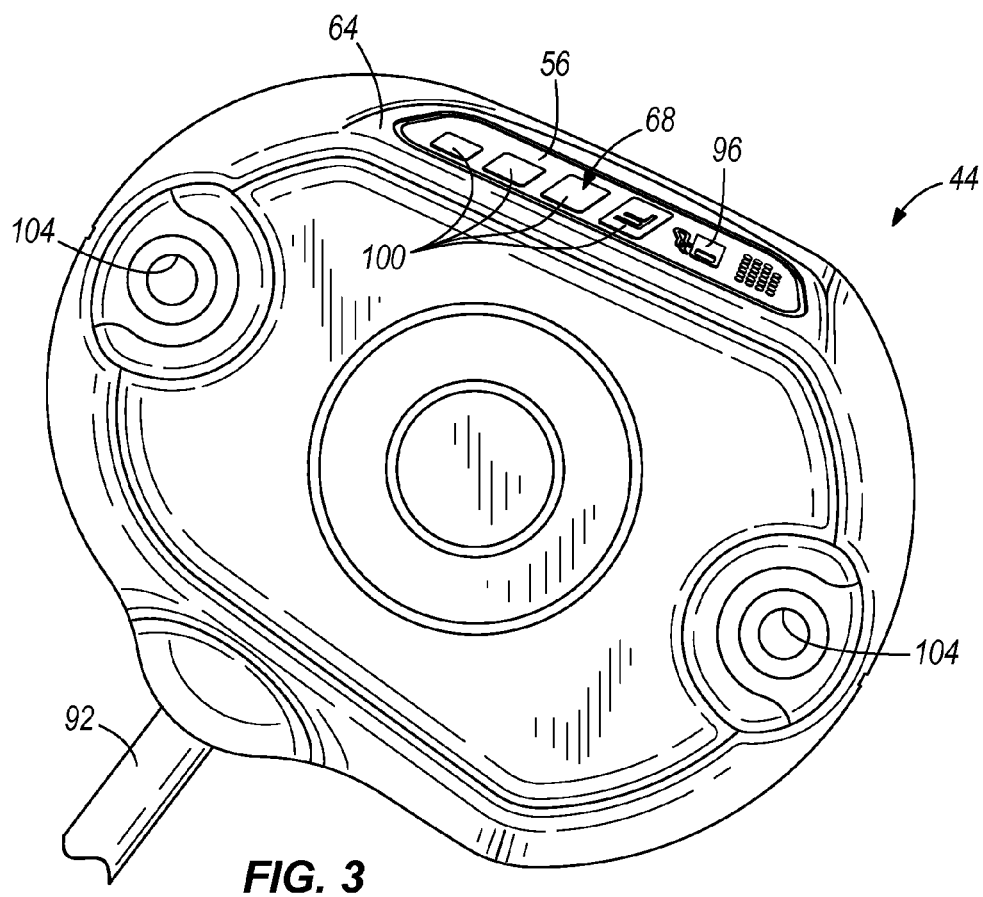
FIG. 3 is a top view of the cover of the front brake master cylinder.
Figure 4:
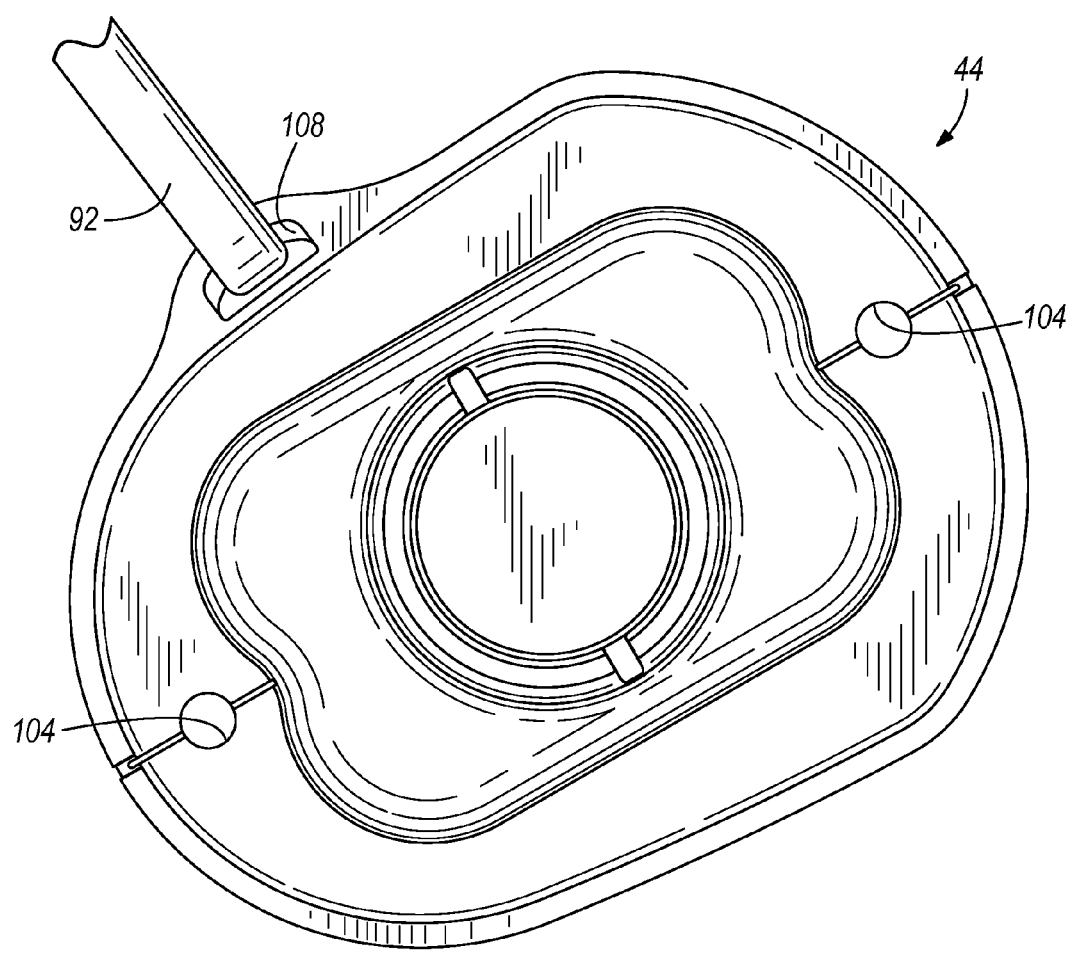
FIG. 4 is a bottom view of the cover of the front brake master cylinder.
Figure 5:
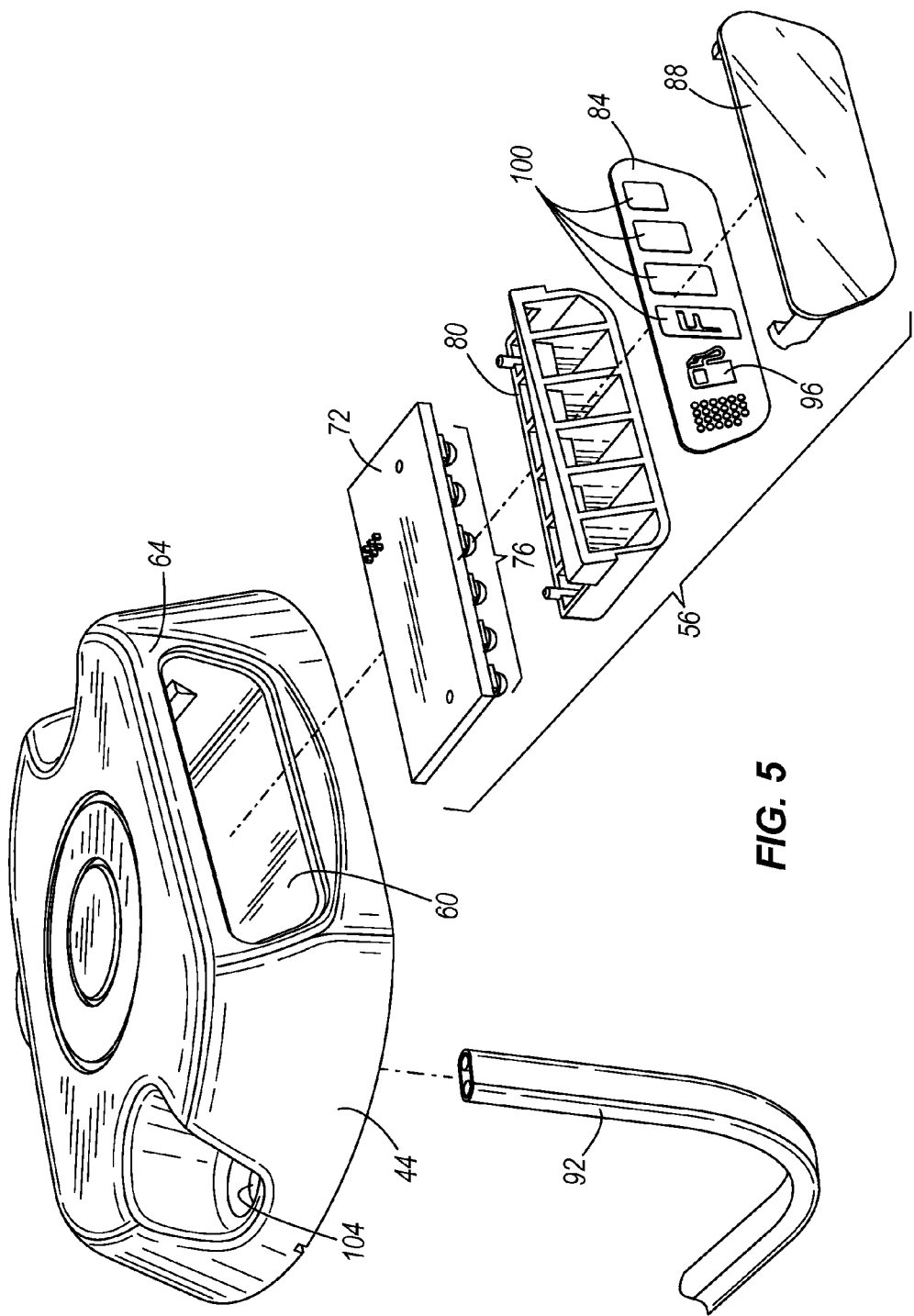
FIG. 5 is an exploded assembly view of the cover of the front brake master cylinder.
Figure 6:
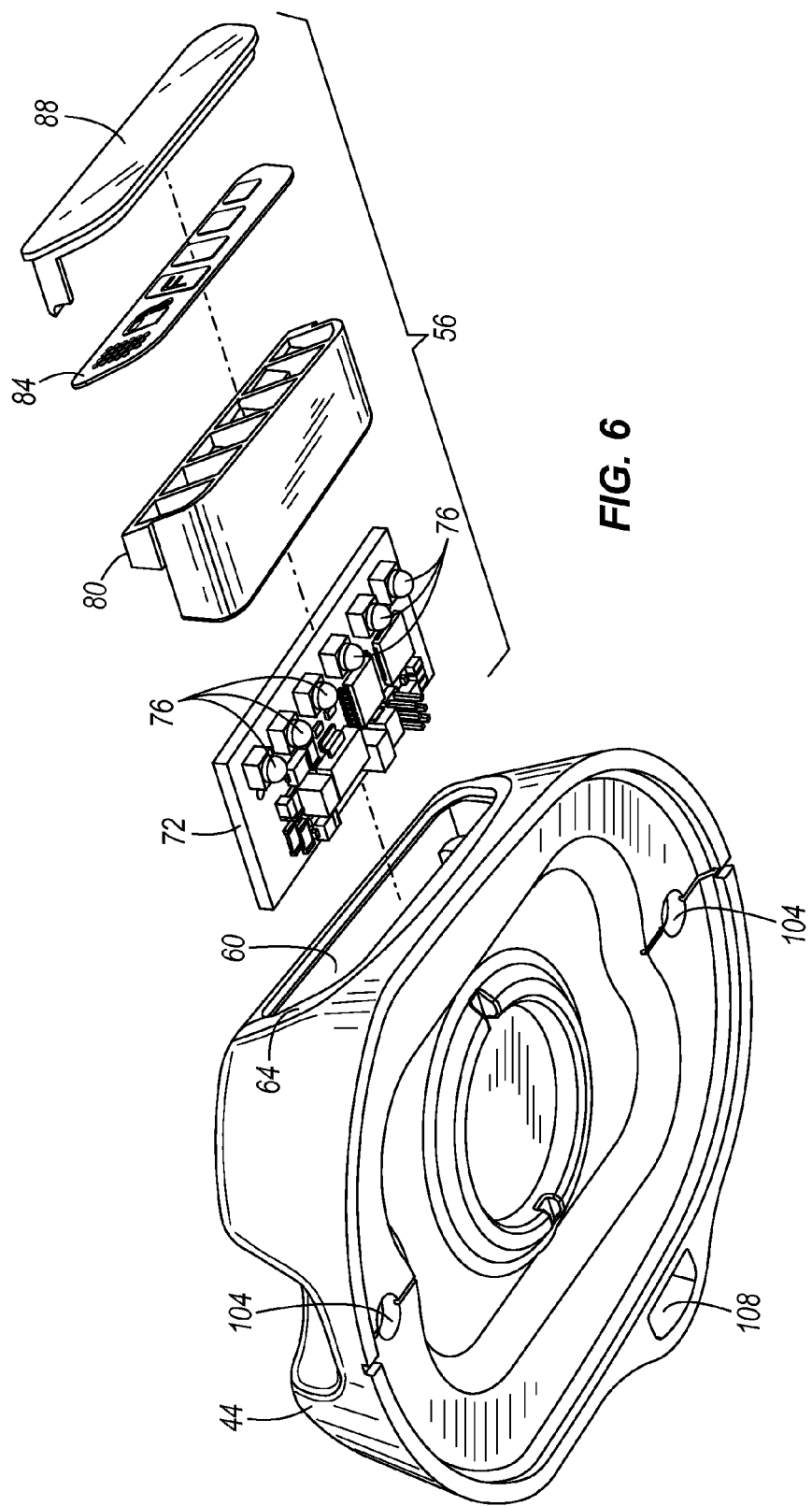
FIG. 6 is another exploded assembly view of the cover of the front brake master cylinder.
Figure 7:
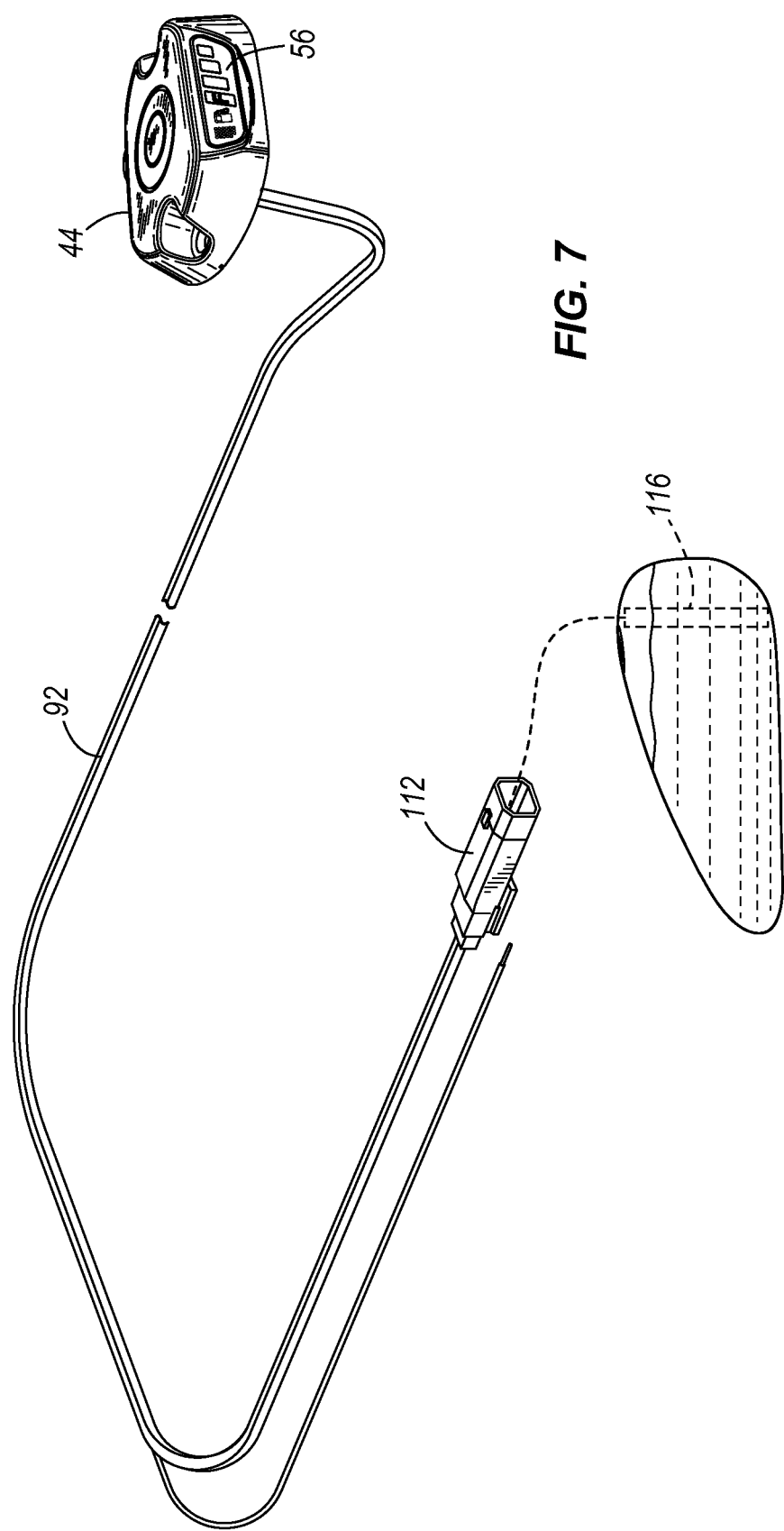
FIG. 7 is a perspective view of the cover of the front brake master cylinder, illustrating the wiring associated with the electronic display unit.

With particular reference to FIGS. 5 and 6, the cover 44 of the master cylinder 40 includes a recess 60 open generally toward a rider-facing direction when the master cylinder 40 is coupled to the handlebar 24 as shown in FIG. 1. The recess 60 extends generally horizontally into the cover 44 from an exterior surface 64 of the cover 44. In the illustrated construction, the exterior surface 64 is a generally upright sidewall surface that has a slight upward tilt (toward the eyes of a mounted rider). The recess 60 defines a generally horizontal recess depth, and the electronic display unit 56 is received in the recess 60 of the cover 44. The recess 60 is of sufficient depth such that a majority of the display unit 56 or the entire display unit 56 is received within the recess 60. As shown in FIGS. 2 and 3, an exterior display surface 68 of the display unit 56 is substantially flush with the exterior surface 64 of the cover 44.

As shown in FIGS. 5 and 6, the electronic display unit 56 includes a printed circuit board (PCB) 72 having a plurality of light emitting diodes (LEDs) 76, a divider 80 for segregating the light from the LEDs 76, a printed overlay 84, and a translucent window 88. The PCB 72 receives information from one or more sensors (not shown) on the motorcycle 20 through one or more wires of the wire bundle 92 (FIGS. 3-5 and 7). In the illustrated construction, a fuel level sensor sends a signal indicative of the fuel amount to the PCB 72 and the PCB 72 outputs a signal to the LEDs 76 to illuminate some or all of the LEDs 76 to convey the fuel level to the rider. In the illustrated construction, the LEDs 76 are arranged in a row and a number of the total LEDs 76 (scaled to be approximately proportional to the existing percentage of fuel capacity remaining) are illuminated. The printed overlay 84, which may be a printed sticker, includes a fuel icon 96 and a plurality of block icons 100 of varying size arranged in a row next to the fuel icon 96. The printed overlay 84 may also have diffusive properties to improve light uniformity. The translucent window 88 engages with the recess 60 of the cover 44 (e.g., by snapping together with an interference fit) to retain the display unit 56 in the recess 60 and seal the recess 60 from the elements, such as rain or debris.

In an alternate construction, the display unit 56 can include a liquid crystal display (LCD) or an organic LED (OLED) display instead of or in addition to the individual PCB-mounted LEDs 76. The LCD or OLED display may eliminate the need for the divider 80 (or at least some features thereof) and may provide more detailed information than the combination of the LEDs 76 and the printed overlay 84. Furthermore, the display unit 56 can include one or more operational buttons configured to toggle the display between a plurality of different types of information to be displayed or different display characteristics including but not limited to brightness, color, units of measure, etc.

The cover 44 of the master cylinder 40 is coupled to the reservoir body 42 with a pair of fasteners that extend through a pair of opposed openings 104 in the cover 44. An additional opening 108 is provided in the cover 44 to allow passage of the wire bundle 92 out of the cover 44 from the PCB 72. The wire bundle 92 extends through a passage in the cover 44 that is separate from and not in fluid communication with hydraulic fluid in the master cylinder 40. The wire bundle 92 exits the cover 44 outside and in front of the reservoir body 42. In some constructions, the cover 44 can include a sight glass portion that allows a fluid level within the master cylinder 40 to be observed. In such constructions, the passage for the wire bundle extends around the sight glass, which may be centrally located in the cover 44.

The wire bundle 92 can include wires to convey information to the PCB 72 and to couple the display unit 56 with an electrical power source, such as the battery of the motorcycle 20, unless an on-board power source (e.g., battery, photovoltaic unit, etc.) is included. In some configurations of the display unit 56 (including but not limited to fuel level, tachometer, oil pressure/temperature, gear indicator, etc.), communication with a remote sensor is required. The wire bundle 92 provides one or more wires to establish electrical communication between one or more remote sensors (e.g., fuel level sensor 116, FIG. 7) and the display unit 56. The wire bundle 92 may terminate with a wiring harness 112 to easily connect the wire bundle 92 with at least one of the remote sensor 116 and an electrical power source.

In some constructions, the display unit 56 can be configured to operate as a turn signal indicator to display to the rider that a turn signal is activated. In such constructions, both the front brake master cylinder 40 and a clutch master cylinder (not shown) may be provided with similar display units, and instead of (or in addition to) receiving information from one or more sensors, the display units 56 may receive a signal from a controller, such as a turn signal control module. Regardless of the type of information displayed by the display unit 56, the wire bundle 92 can be replaced by a remote transmitter and a wireless receiver so that the display unit 56 displays information received from a sensor, controller, etc. through a wireless signal(s). In some constructions, the display unit 56 need not even be in communication with a remote sensor. For example, the display unit 56 is configured in some constructions to operate solely upon the control of an on-board controller (i.e., PCB 72). In such constructions, the display unit 56 is operable to display information that is not vehicle-related and is not dependent upon a remotely-measured characteristic of the motorcycle 20—for example, time of day or outside temperature.

Because the display unit 56 is internally integrated into the master cylinder 40, the aesthetic appearance of the master cylinder 40 can be maintained very similar to a standard master cylinder having no display, especially when the motorcycle's electrical system is not energized. When the motorcycle's electrical system is off, the LEDs 76 are non-illuminated such that the display unit 56 may be (depending upon the coloration, reflectivity, etc. of the printed overlay 84) substantially invisible to onlookers since no part of the display unit 56 protrudes from the master cylinder 40. Furthermore, the internal integration of the display unit 56 into the recess 60 prevents the exposure of any edges of the display unit 56 so that it cannot be snagged or caught on anything, and it cannot be easily removed from the master cylinder 40 by a vandal.

The master cylinder cover 44 with display unit 56 can be configured as a direct replacement for an existing original equipment (OE) master cylinder cover that has no display. As such, the cover 44 can include an interface with mating, sealing, and fastening features substantially identical to those provided in the OE master cylinder cover.

Thus, the invention provides, among other things, a master cylinder with an internally integrated display unit for conveniently displaying information to the rider of the motorcycle while providing an aesthetically pleasing appearance. Various features and advantages of the invention are set forth in the following claims.

What is claimed is:

1. A cover for a hydraulic master cylinder comprising:
   an interface configured to sealingly engage with a master cylinder body to jointly define a hydraulic fluid reservoir; and
   an electronic display unit positioned at least partially within the cover and viewable from outside the cover.

2. The cover of claim 1, wherein the cover defines a recess that is not in fluid communication with the interface, the electronic display unit being positioned at least partially within the recess.

3. The cover of claim 2, wherein the recess is open to an exterior sidewall surface of the cover.

4. The cover of claim 2, further comprising a translucent window substantially enclosing the electronic display unit within the recess.

5. The cover of claim 2, wherein the electronic display unit has a wire bundle coupled thereto, the cover further comprising an opening in communication with the recess, the wire bundle extending from the electronic display unit through the opening and away from the cover.

6. The cover of claim 1, wherein the electronic display unit is configured to display at least one of vehicle-related information transmitted to the electronic display unit from a remote vehicle sensor and non-vehicle-related information including at least one of time and ambient temperature.

7. The cover of claim 6, further comprising a wireless signal transmitter and receiver for transmitting information to the electronic display unit.

8. The cover of claim 6, further comprising an on-board controller configured to control the electronic display unit to display non-vehicle-related information.

9. A hydraulic master cylinder assembly comprising:
   a body defining a reservoir configured to hold a volume of fluid;
   a cover sealingly engaged with the body to contain the volume of fluid; and
   an electronic display unit positioned at least partially within the cover and viewable from outside the cover.

10. The hydraulic master cylinder assembly of claim 9, further comprising a piston movable in the body in response to a hand-operable lever, wherein actuation of the hand-operable lever is configured to move the piston within the body to selectively increase a pressure of the fluid.

11. The hydraulic master cylinder assembly of claim 10, wherein the body has an outlet in fluid communication with the piston that is configured to be fluidly coupled with a hydraulically-actuable mechanism selected from the group consisting of a brake caliper and a clutch.

12. The hydraulic master cylinder assembly of claim 9, wherein the cover defines a recess that is not in fluid communication with the reservoir when the cover is sealingly engaged with the body, the electronic display unit being positioned at least partially within the recess.

13. The hydraulic master cylinder assembly of claim 12, wherein the recess is open to an exterior sidewall surface of the cover.

14. The hydraulic master cylinder assembly of claim 12, further comprising a translucent window substantially enclosing the electronic display unit within the recess.

15. The hydraulic master cylinder assembly of claim 12, wherein the electronic display unit has a wire bundle coupled thereto, the cover further comprising an opening in communication with the recess, the wire bundle extending from the electronic display unit through the opening and away from the cover.

16. The hydraulic master cylinder assembly of claim 9, wherein the electronic display unit is configured to display at least one of vehicle-related information transmitted to the electronic display unit from a remote vehicle sensor and non-vehicle-related information including at least one of time and ambient temperature.

17. The hydraulic master cylinder assembly of claim 16, further comprising a wireless signal transmitter and receiver for transmitting information to the electronic display unit.

18. The hydraulic master cylinder assembly of claim 16, further comprising an on-board controller configured to control the electronic display unit to display non-vehicle-related information.

19. A motorcycle comprising:
   a handlebar;
   a wheel-braking device;
   a clutch configured to engage and disengage a transmission input with an engine output;
   a hand lever associated with one of the wheel-braking device and the clutch; and
   a hydraulic master cylinder assembly associated with the hand lever, the hydraulic master cylinder assembly including:
      a body defining a reservoir configured to hold a volume of fluid,
      a cover sealingly engaged with the body to contain the volume of fluid, and
      an electronic display unit positioned at least partially within the cover and viewable from outside the cover.

20. The motorcycle of claim 19, wherein the hydraulic master cylinder assembly further comprises a piston movable in the body, the piston having an upstream side coupled with the hand lever and a downstream side opposite the upstream side, wherein actuation of the hand lever is configured to move the piston within the body and increase the pressure of the fluid on the downstream side of the piston to actuate the one of the wheel-braking device and the clutch that is associated with the hand lever.

21. The motorcycle of claim 19, wherein the cover defines a recess that is not in fluid communication with the reservoir when the cover is sealingly engaged with the body, the electronic display unit being positioned at least partially within the recess.

22. The motorcycle of claim 21, wherein the recess is open to an exterior sidewall surface of the cover.

23. The motorcycle of claim 21, wherein the hydraulic master cylinder assembly further comprises a translucent window substantially enclosing the electronic display unit within the recess.

24. The motorcycle of claim 21, wherein the electronic display unit has a wire bundle coupled thereto, the cover further comprising an opening in communication with the recess, the wire bundle extending from the electronic display unit through the opening and away from the cover.

25. The motorcycle of claim 19, wherein the electronic display unit is configured to display at least one of vehicle-related information transmitted to the electronic display unit from a remote vehicle sensor and non-vehicle-related information including at least one of time and ambient temperature.

26. The motorcycle of claim 25, further comprising a wireless signal transmitter and receiver for transmitting vehicle-related information to the electronic display unit.

27. The motorcycle of claim 25, further comprising an controller on-board the hydraulic master cylinder assembly, the controller being configured to control the electronic display unit to display non-vehicle-related information.

\* \* \* \* \*